(12) United States Patent
Higuchi et al.

(10) Patent No.: US 8,018,896 B2
(45) Date of Patent: Sep. 13, 2011

(54) UPLINK AND DOWNLINK CHANNEL CONFIGURATION METHOD IN RADIO COMMUNICATION SYSTEM

(75) Inventors: Kenichi Higuchi, Yokohama (JP); Mamoru Sawahashi, Yokohama (JP); Hiroyuki Atarashi, Yokohama (JP)

(73) Assignee: NTT Docomo, Inc., Tokyo (JP)

( * ) Notice: Subject to any disclaimer, the term of this patent is extended or adjusted under 35 U.S.C. 154(b) by 285 days.

(21) Appl. No.: 12/278,941

(22) PCT Filed: Feb. 6, 2007

(86) PCT No.: PCT/JP2007/052002
§ 371 (c)(1),
(2), (4) Date: Jan. 26, 2009

(87) PCT Pub. No.: WO2007/091546
PCT Pub. Date: Aug. 16, 2007

(65) Prior Publication Data
US 2010/0165873 A1    Jul. 1, 2010

(30) Foreign Application Priority Data
Feb. 8, 2006   (JP) .................................. 2006-031745

(51) Int. Cl.
*H04Q 7/00*   (2006.01)
*H04B 7/216*  (2006.01)

(52) U.S. Cl. ......... 370/329; 370/335; 370/341; 370/342

(58) Field of Classification Search .................. None
See application file for complete search history.

(56) References Cited

U.S. PATENT DOCUMENTS

| | | | | |
|---|---|---|---|---|
| 6,807,192 B2 * | 10/2004 | Terry | ............................ | 370/469 |
| 7,266,107 B2 * | 9/2007 | Choi et al. | .................... | 370/341 |
| 7,340,256 B2 * | 3/2008 | Speight | ......................... | 455/450 |
| 7,756,079 B2 * | 7/2010 | Yi et al. | ........................ | 370/328 |
| 2004/0116126 A1 * | 6/2004 | Cave et al. | .................... | 455/450 |

FOREIGN PATENT DOCUMENTS

| | | |
|---|---|---|
| EP | 1392075 A1 | 2/2004 |
| JP | 2002-518960 A | 6/2002 |
| JP | 2004-135292 A | 4/2004 |

(Continued)

OTHER PUBLICATIONS

International Search Report w/translation from PCT/JP2007/052002 dated May 22, 2007 (5 pages).

(Continued)

*Primary Examiner* — Ayaz R Sheikh
*Assistant Examiner* — Blanche Wong
(74) *Attorney, Agent, or Firm* — Osha • Liang LLP

(57) ABSTRACT

A disclosed downlink channel configuration method in a radio communication system includes a step of including a broadcast channel, a paging channel, and a downlink shared channel as transport channels; a step of including as a physical channel a physical downlink shared channel to which the downlink shared channel of the transport channel is mapped; and a step of sharing the downlink shared channel by plural users without using a dedicated channel separately allocated to each of the users. In a preferred embodiment, as the physical channels, there are further included a physical broadcast channel as an independent radio resource to which the broadcast channel of the transport channel is mapped and a physical paging channel as an independent radio resource to which the paging channel of the transport channel is mapped.

5 Claims, 6 Drawing Sheets

FOREIGN PATENT DOCUMENTS

| WO | 2004/013978 A2 | 2/2004 |
|----|----------------|--------|
| WO | 2004/054135 A1 | 6/2004 |
| WO | 2005/018269 A1 | 2/2005 |

OTHER PUBLICATIONS

Written Opinion from PCT/JP2007/052002 dated May 22, 2007 (5 pages).

"L1/L2 Control Channel Structure for E-UTRA Downlink", NTT DoCoMo, Inc., 3GPP TSG-RAN WG1 LTE Ad Hoc Meeting Helsinki Finland; Jan. 23-25, 2006; R1-060032; pp. 1-8 (8 pages).

Keiji Tachikawa, "W-CDMA Mobile Communication System", Maruzen K.K., pp. 97-99, Jun. 25, 2001.

Japanese Office Action for Application No. 2006-031745, mailed on May 25, 2010 (9 pages).

NTT DoCoMo, Transport Channels and Physical Channels in E-UTRA Downlink, 3GPP TSG-RAN WG1 LTE Ad Hoc Meeting R1-060162, Jan. 25, 2006, pp. 1-3.

3rd Generation Partnership Project; Technical Specification Group Radio Access Network; Evolved Universal Terrestrial Radio Access (E-UTRA) and Evolved Universal Terrestrial Radio Access Network (E-UTRAN); Radio interface protocol aspects (Release 7), 3rd Generation Partnership Project, Jan. 2006, 3GPP TR 25.813 V0.3.0.

Indonesian Office Action for Application No. W-00 2008 02614, mailed on Jun. 14, 2010 (4 pages).

\* cited by examiner

UPLINK AND DOWNLINK CHANNEL CONFIGURATION METHOD IN RADIO COMMUNICATION SYSTEM

TECHNICAL FIELD

The present invention generally relates to a channel configuration method in a radio communication system and more particularly to an uplink and downlink channel configuration method for transport channels and physical channels and mapping relationships between the same.

BACKGROUND ART

A conventional WCDMA radio interface has a three-layered channel structure, the physical channel, the transport channel, and the logical channel, so as to flexibly respond to various service providing types and cases of a multi-call (for example, a simultaneous transmission of a voice call and a multimedia call).

As shown in FIG. 1A, the protocol configuration of, the WCDMA radio interface includes a layer 1 (a physical layer), a layer 2 (a data link layer), and a layer 3 (a network layer). The logical channels are defined by the service access points between the layer 3 and the layer 2, and the transport channels are defined by the service access points between the layer 2 and the layer 1. The layer 2 is divided into two sublayers: a Radio Link Control (RLC) sublayer for controlling a radio link and a Media Access Control (MAC) sublayer for, for example, allocating radio resources.

The physical channels are provided for realizing the transmission of the transport channels via actual radio transmission paths and mapped to radio resources on time, frequency, or code areas as transmission channels between radio nodes (a base station and a mobile station) of the layer 1.

The transport channels are provided, as described above, between the physical channel and the MAC sublayer of the layer 2. Further, the transport channels are classified depending on transmission forms as shown in FIG. 1B and feature which and how information is transmitted.

In a conventional WCDMA radio interface, a circuit-switching type data transmission is realized by allocating a dedicated channel (DCH) for each user (see "W-CDMA mobile communication method" edited by Keiji TACHIKAWA, pp. 97-99).

Further, in the common transport channels where data are transmitted and received by sharing radio resources by the users in a service area of a base station, each of a downlink broadcast channel, a paging channel, and a forward access channel does not have any relationship with an independent physical channel, and is mapped to a common control physical channel.

DISCLOSURE OF INVENTION

Problems to be Solved by the Invention

On the other hand, according to Evolved UTRA (Universal Terrestrial Radio Access) where the third generation specification is improved, all the data are transmitted by packet transmission. Therefore, it becomes necessary to provide a new configuration method of the transport channels and the physical channels adapted to all-packet transmission and the mapping relationships between those channels.

Further, in the Evolved UTRA, the broadcast/multicast transmission is employed where multimedia user data are transmitted to plural unspecified or specified users in a cell using the downlink OFDM accesses. Therefore, it becomes necessary to provide a new channel configuration method in consideration of the channels where the signal transmission is performed.

However, as described above, in the spread code allocation method used in a conventional WCDMA system, the interference between sectors in the same cell may degrade the signal transmission characteristics to be obtained.

The present invention is made in light of the problems and may provide a channel configuration method of downlink and uplink transportation channel and physical channel and the mapping relationships between the channels.

Means for Solving the Problems

To solve the problems, according to a first aspect of the present invention, there is provided a downlink channel configuration method in a radio communication system. The downlink channel configuration method includes:
(a) a step of including a broadcast channel, a paging channel, and a downlink shared channel as transport channels;
(b) a step of including as a physical channel a physical downlink shared channel to which the downlink shared channel of the transport channel is mapped; and
(c) a step of sharing the downlink shared channel by plural users without using a dedicated channel separately allocated to each of the users.

In a preferred embodiment, as the physical channel, there is further included a physical broadcast channel as an independent radio resource to which the broadcast channel of the transport channel is mapped.

In another embodiment, as the physical channel, there is further included a physical paging channel as an independent radio resource to which the paging channel of the transport channel is mapped.

When an independent physical channel is provided, it is preferable to transmit the same paging information in the plural sectors controlled by the same base station. By doing this, a mobile station may achieve synchronous diversity reception using delay diversity.

In still another embodiment, as the physical channel, there is further included a Multimedia Broadcast Multicast Service (MBMS) channel as an independent radio resource to which the downlink shared channel of the transport channel is mapped.

When the independent MBMS channel is provided, it is preferable to transmit the same MBMS information in the plural cells or sectors in a prescribed area. By doing this, a mobile station may achieve synchronous diversity reception using delay diversity.

According to a second aspect of the present invention, there is provided an uplink channel configuration method in a radio communication system. The uplink channel configuration method includes:
(a) a step of including a random access channel and an uplink shared channel as transport channels;
(b) a step of including as physical channels a physical random access channel as an independent radio resource to which the random access channel of the transport channel is mapped and a physical uplink shared channel as an independent radio resource to which the uplink shared channel of the transport channel is mapped; and
(c) a step of sharing the uplink shared channel by plural users without using a dedicated channel separately allocated to each of the users.

ADVANTAGEOUS EFFECT OF THE INVENTION

According to an embodiment of the present invention, the radio resources may be effectively used when adapted to all-packet transmission.

EXPLANATION OF REFERENCES

11 BROADCAST CHANNEL (TRANSPORT CHANNEL)
12 PAGING CHANNEL (TRANSPORT CHANNEL)
13 DOWNLINK SHARED CHANNEL (TRANSPORT CHANNEL)
21 PILOT CHANNEL
22 PHYSICAL BROADCAST CHANNEL
23 DOWNLINK SYNCHRONIZATION CHANNEL
24 PHYSICAL PAGING CHANNEL
25 PAGING INDICATOR CHANNEL
26 PHYSICAL DOWNLINK SHARED CHANNEL
27 L1/L2 CONTROL CHANNEL
28 MBMS CHANNEL
30 BASE STATION
40 MOBILE STATION
51 RANDOM ACCESS CHANNEL (TRANSPORT CHANNEL)
52 UPLINK SHARED CHANNEL (TRANSPORT CHANNEL)
61 PILOT CHANNEL
62 UPLINK SYNCHRONIZATION CHANNEL
63 PHYSICAL RANDOM ACCESS CHANNEL
64 PHYSICAL UPLINK SHARED CHANNEL
65 L1/L2 CONTROL CHANNEL

BEST MODE FOR CARRYING OUT THE INVENTION

In the following, a preferred embodiment of the present invention is described with reference to the accompanying drawings.

Figure 1A:
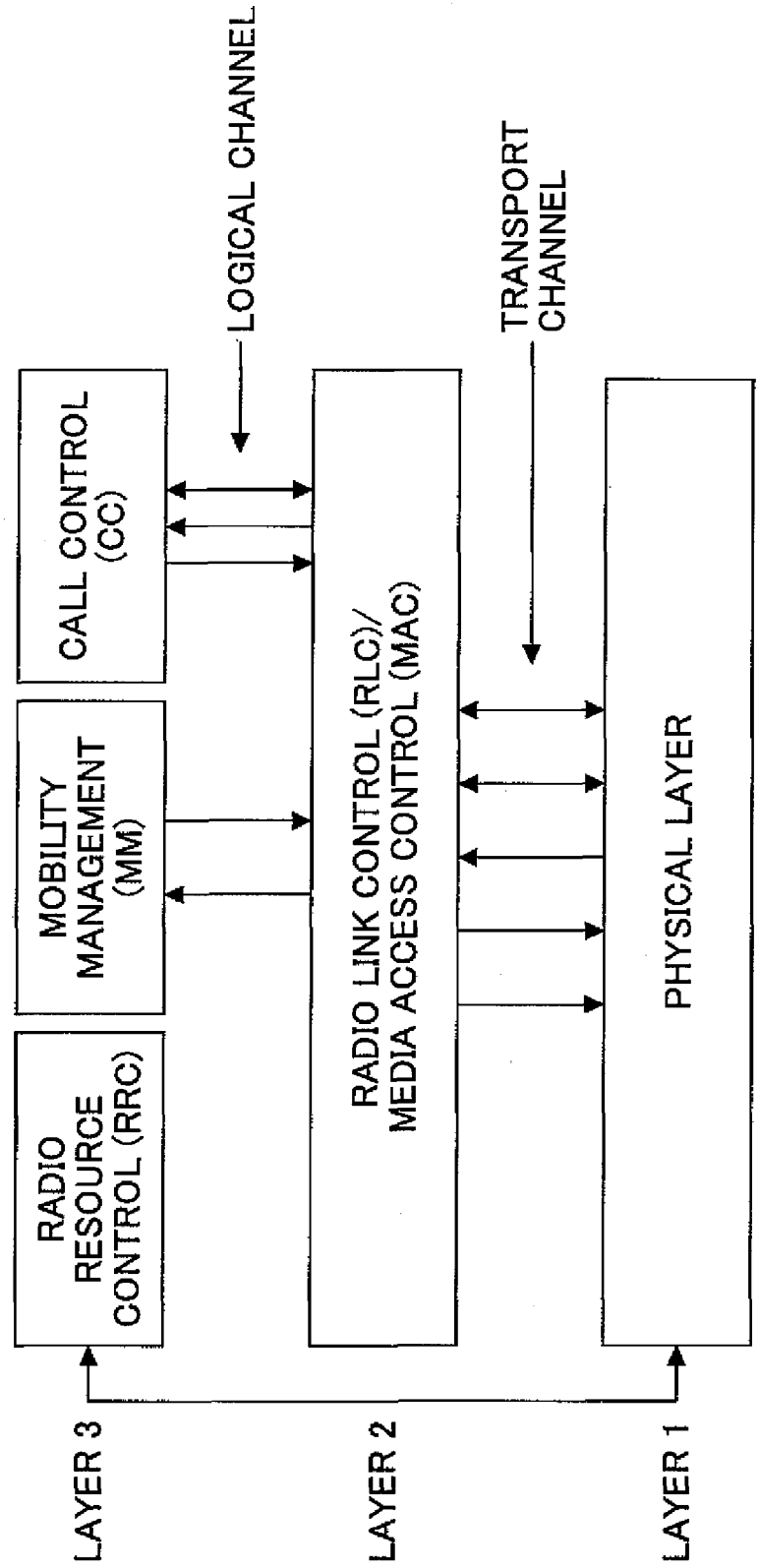
FIG. 1A is a drawing showing a protocol structure of a WCDMA radio interface.
Figure 1B:
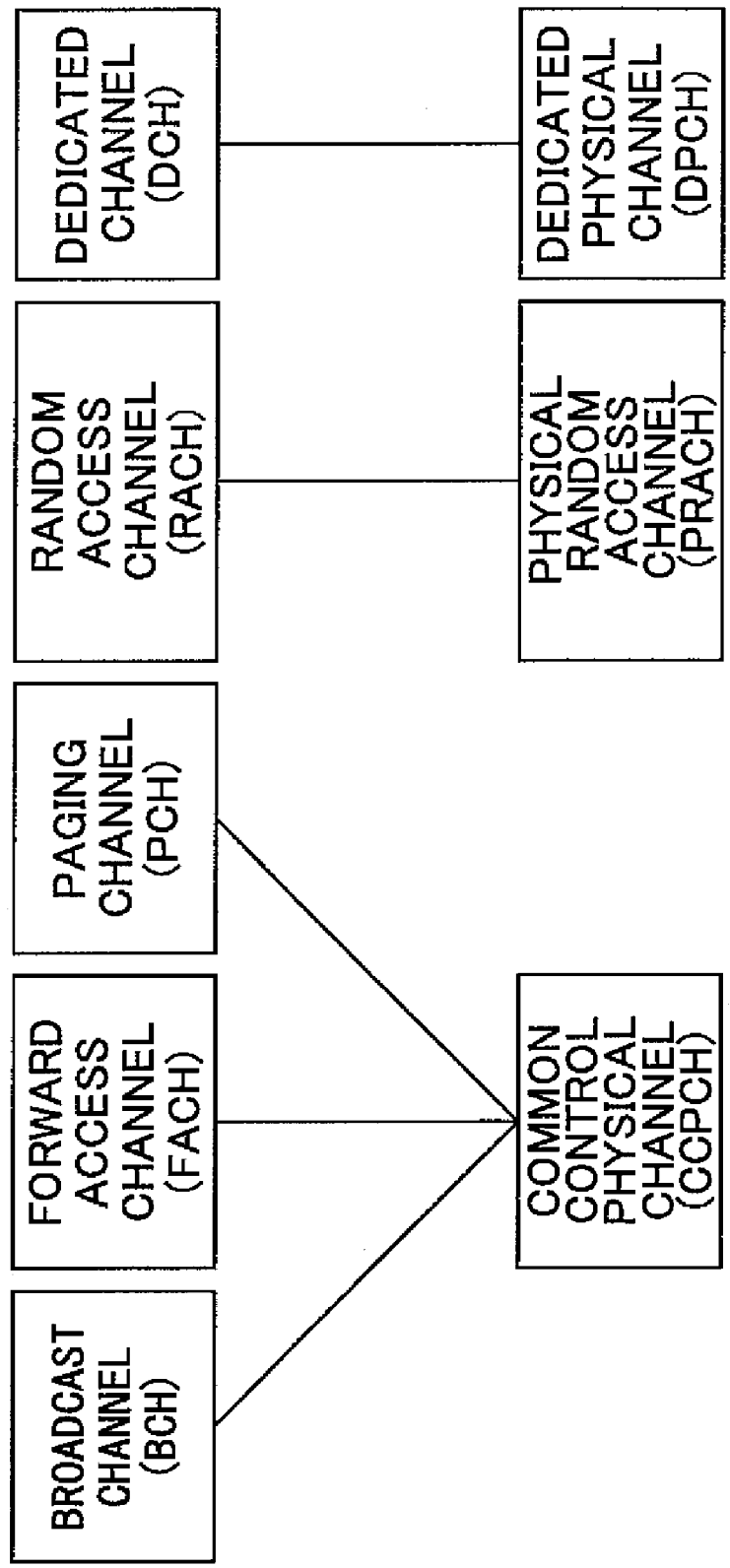
FIG. 1B is a drawing showing conventional mapping relationships between transport channels and physical channels.
Figure 2:
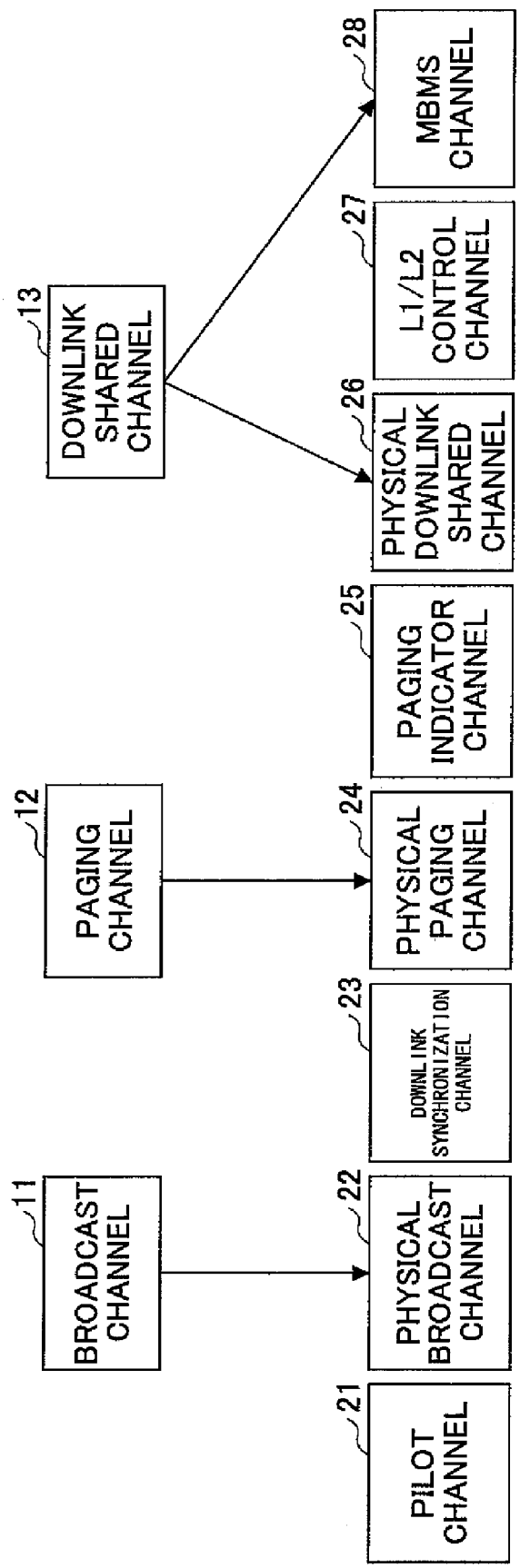
FIG. 2 is a drawing showing mapping relationships between the downlink transport channels and the downlink physical channels according to an embodiment of the present invention.

FIG. 2 is a drawing showing a configuration of downlink transport channels, downlink physical channels, and mapping relationships between the transport channels and the physical channels according to an embodiment of the present invention.

<A Downlink Channel Configuration Method>

First, a channel configuration method is described. In the downlink channel configuration, the first feature is that a dedicated channel allocated to each user is removed, and a downlink shared channel is provided. Through the downlink shared channel, effective use of radio resources may be obtained by sharing the traffic data and control signals of an upper layer among plural users.

As the second feature, an independent physical broadcast channel and a physical paging channel are provided, and a new MEMS channel is also provided.

More specifically, the downlink transport channels include a broadcast channel 11, a paging channel 12, and a downlink shared channel 13.

The broadcast channel 11 always transmits the system information unique to the system and the cell or sector information unique to the cell or sector to the entire cell or the entire sector.

The paging channel 12 signals at a certain time interval that the user has an incoming call and is always transmitted to a prescribed position registration area.

The downlink shared channel 13 transmits traffic data and the control signals of the upper layer and is shared among plural users.

On the other hand, the downlink physical channels include a pilot channel 21, a physical broadcast channel 22, a downlink synchronization channel 23, a physical paging channel 24, a paging indicator channel 25, a physical downlink shared channel 26, a layer1/layer2 (L 1/L2) control channel 27, and an MBMS (Multimedia Broadcast Multicast Service) channel 28.

The pilot channel 21 transmits a reference symbol used for, for example, channel estimation, and the pattern of the symbol is previously known between base station and mobile station.

The physical broadcast channel 22 actually transmits the broadcast information from the base station to the mobile station through a radio path.

The downlink synchronization channel 23 performs a cell search and an initial synchronization for establishing the downlink. The downlink synchronization channel 23 transmits a signal including information for performing at least any of symbol synchronization, radio frame synchronization, cell recognition, and identification of cell groups each including plural cells.

The physical paging channel 24 transmits a paging signal informing a mobile station in the coverage area of data reception.

The paging indicator channel 25 transmits a signal indicating a radio resource where a paging channel is being transmitted (multiplexed). Along with the transmission of the paging indicator channel, the physical paging channel is transmitted.

The physical downlink shared channel 26 transmits traffic data (user data) and the control signals of the upper layer.

The L1/L2 control channel 27 is a control channel associated with the physical downlink channel 26, and transmits a control signal associated with the layers 1 and 2. The L1/L2 control channel 27 transmits, for example, a modulation method when link adaptation is employed, the control bits specifying information such as the code rate, the resend control bits of ACK/NACK used when a hybrid ARQ (Automatic Repeat reQuest) is employed, or the control bits specifying the allocation information of the radio resources.

The MBMS channel 28 transmits the user data to the specified (multicast) terminals or the unspecified (broadcast) terminals in a prescribed area including plural cells.

As described above, unlike circuit-switching type radio communication systems, no dedicated channel exclusively allocated to each user is used. All of the traffic data and the control signals of the upper layer are transmitted by the physical downlink shared channel 26.

For example, when a user accesses a home page on the Internet and is in the process of downloading the home page, the data are being transmitted between the base station and the mobile station. However, while the user is reading a homepage, no data are transmitted between the base station and the mobile station. Unfortunately, in a conventional circuit-switching type dedicated channel, the channel is being occupied even when no data are transmitted until the user terminates the connection, thereby degrading the efficient use of the radio resources.

On the other hand, by employing a shared channel transmission according to an embodiment of the present invention, at the time when the user finishes downloading the home page, the channel is no longer occupied by the user and is ready to be allocated to another user. Therefore, the efficient use of the radio resources may be improved.

<Mapping Between the Downlink Transport Channels and the Downlink Physical Channels>

Next, mapping relationships between the transport channel and the physical channel based on the above channel configuration method are described.

(Mapping of the Broadcast Channel)

The broadcast channel 11 is mapped to the physical broadcast channel 22 defined as an independent radio resource previously determined. The physical broadcast channel 22 transmits the broadcast information to the entire coverage area (such as a sector or a cell) at a fixed data rate.

The physical broadcast channel 22 is required to be received by all users in the cell (coverage area) without any control information in advance. To this end, a radio resource known by all users is allocated as an independent physical broadcast channel 22, and the broadcast channel 11 is mapped to the physical broadcast channel 22.

Figure 3:
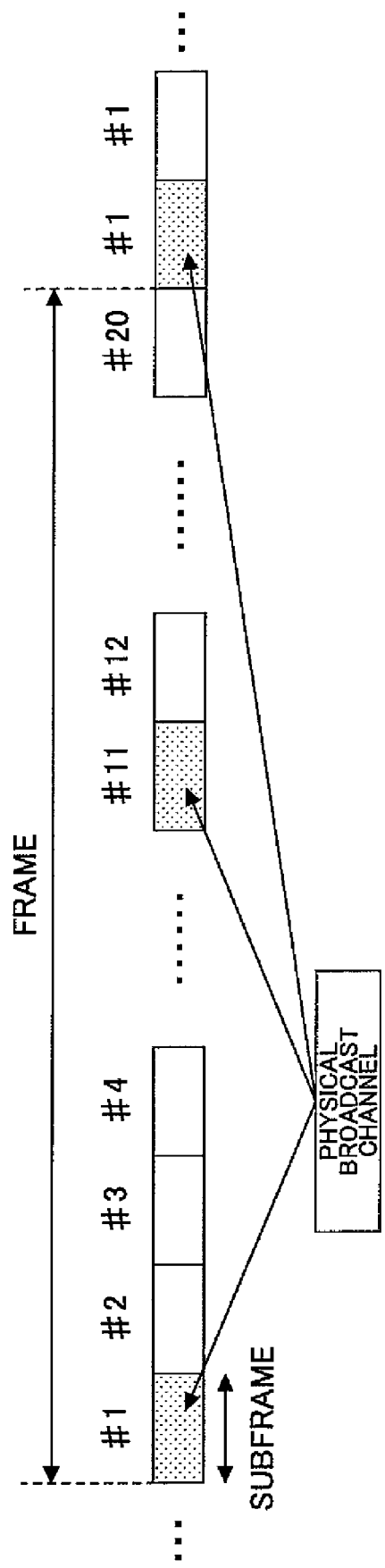
FIG. 3 is a drawing showing an example how a downlink broadcast channel is inserted.

FIG. 3 is a drawing showing an allocation example of the physical broadcast channel 22. For example, in each frame having 20 subframes, the first and the eleventh frames (radio resources) are allocated as the physical broadcast channel 22, and the broadcast channel 11 which is a transport channel is mapped to the radio resources.

It should be noted that the broadcast channel is generally configured to transmit the information unique to each sector from the sector. However, depending on the type of broadcast information, the information may be common among plural cells or sectors. Such common information includes system information from a core network to a mobile station and the information of channel configuration. Because of this feature, the broadcast channel may transmit the same signal in plural cells or sectors. By using this feature, when OFDM radio access is used, the same signal may be transmitted to each sector by using a delay diversity method in a manner so that a mobile station achieves diversity reception to receive signals from plural sectors of the same base station.

(Mapping the Paging Channel)

The paging channel 12 is mapped to the physical paging channel 24 defined as an independent radio resource previously determined.

The physical paging channel 24 transmits the paging information to a prescribed paging area to signal that a user has an incoming call. Therefore, it is necessary for all users in the prescribed paging area to receive the paging information.

Further, the paging channel transmits the same signal in the plural cells and sectors in the prescribed paging area. Therefore, by using this feature, when OFDM radio access is used, the same signal is transmitted to each sector by using a delay diversity method in a manner so that a mobile station achieves diversity reception to receive signals from plural sectors in the coverage area of the same base station.

Figure 4:
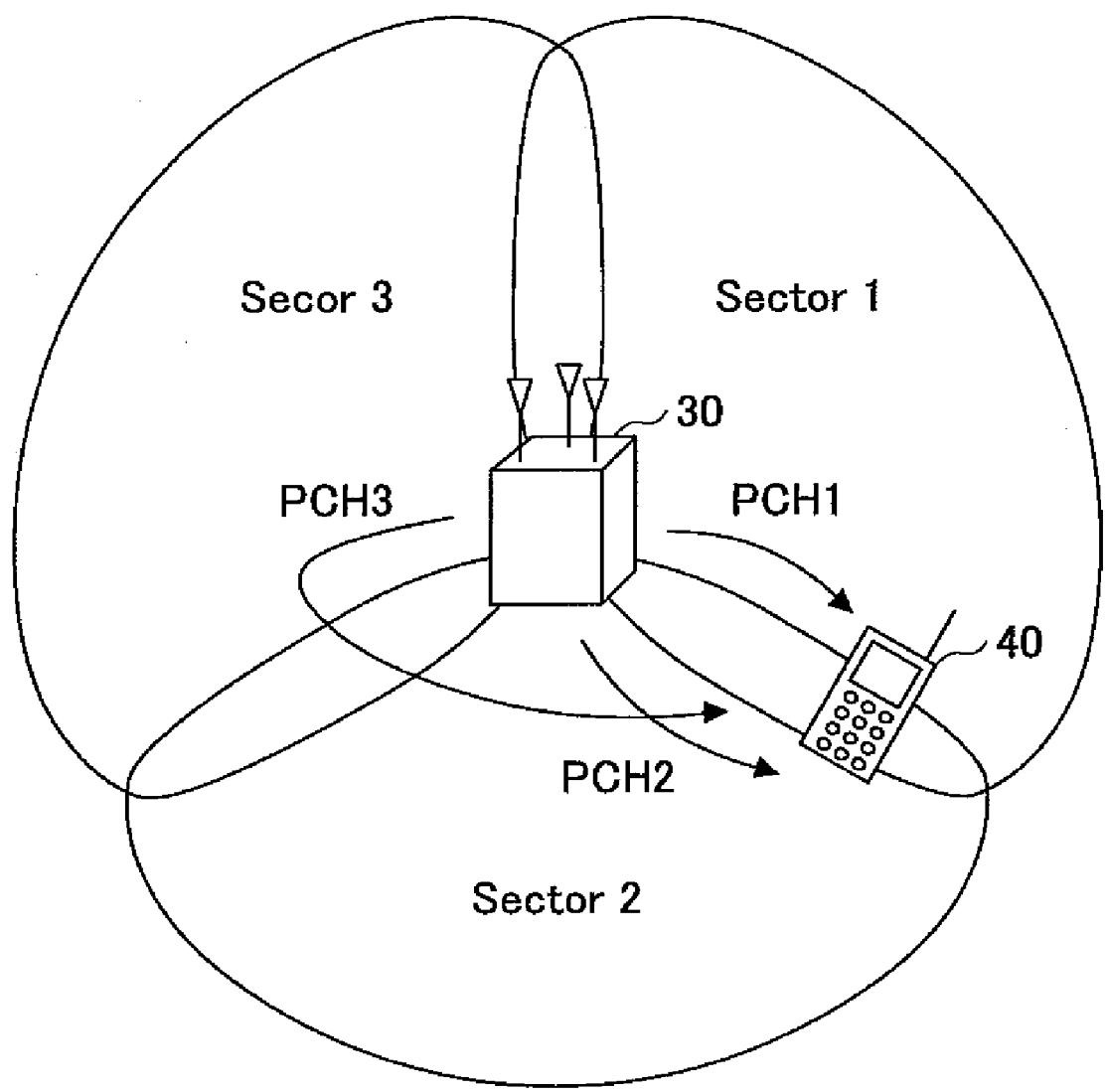
FIG. 4 is a drawing illustrating synchronous diversity reception in a downlink paging channel.

FIG. 4 is a drawing illustrating synchronous diversity reception of the physical paging channel 24. The cell controlled by the base station 30 is divided into three sectors 1 through 3. The same physical paging channel 24 transmitted to each sector from the base station 30 propagates through multi-paths and reaches the mobile station 40. In this case, the signals from the plural sectors are received within the delay time of the cyclic prefix length of the OFDM signal so as to achieve the synchronous diversity reception. Namely, by receiving the same signal through more propagation paths, the probability of correct estimation is improved, thereby realizing a high quality received signal.

To realize such a synchronous diversity reception of the OFDM radio access, it is necessary to transmit the paging signal having the same transmission format from each cell. Namely, it is necessary to separately define a physical channel for transmitting the same paging signal to plural sectors as an independent physical channel in addition to the other physical channels required to transmit a signal unique to each sector.

To this end, as an independent radio resource, the physical paging channel 24 is provided so as to transmit the same signal from each cell to the plural sectors.

It should be noted that, as another mapping method, the paging channel may be mapped to the physical downlink shared channel 26. In this case, no physical paging channel 24 is defined. When the paging channel mapped to the physical downlink shared channel 26 achieves synchronous diversity reception, it should be adjusted so that the physical downlink shared channel to which the paging channel is allocated has the same transmission format temporarily.

(Mapping of the Downlink Shared Channel)

The downlink shared channel is mapped to the physical downlink shared channel 26 (unicast transmission) or the MBMS channel 28 (broadcast/multicast transmission) depending on the type of traffic to be transmitted.

When the traffic data or the control information of a specific user is transmitted, namely when unicast transmission is performed, the throughput of each cell should be able to be improved by performing packet scheduling for allocating the radio resources to each user in consideration of the propagation channel conditions of each user. Therefore, by providing the physical downlink shared channel 26 by which plural users can share the downlink physical channel, the improvement of the throughput of the entire cell is realized.

On the other hand, when traffic data are transmitted to unspecified or specified plural users in a prescribed area as broadcast or multicast transmission, the same signal is transmitted to plural cells or sectors in the prescribed area. As a result, the mobile station may receive plural signals having the same contents propagated from plural cells or sectors by the multi-path propagation. The same as the case of the paging channel, when OFDM radio access is used, the signals from the plural cells (sectors) within the delay time of the cyclic prefix length of the OFDM signal may be synthesized and received so as to achieve synchronous diversity reception, thereby realizing a high quality signal.

To realize this, it is necessary to provide a physical channel for transmitting the same signal to plural sectors as an independent physical channel different from the other physical channel required to transmit the signal unique to each sector.

To this end, as an independent radio resource, an MBMS (Multimedia Broadcast/Multicast Service) channel is provided so as to transmit the same MBMS signal to each cell. As a result, the synchronous diversity reception of the MBMS signal from plural sectors at a mobile station is realized.

(Configuration Method of Paging Indicator Channel)

The paging indicator channel transmits a signal indicating a radio resource where the paging channel is transmitted (multiplexed). Along with the transmission of this paging indicator channel, the physical paging channel is transmitted.

Further, the same as the case of the paging channel, the paging indicator channel transmits the same signal in plural cells or sectors in a prescribed paging area. Therefore, by using this feature, when the same signal is transmitted to each sector by using the delay diversity method as a mobile station achieves diversity reception from plural sectors in the same coverage area of the base station, and it becomes possible to realize a high quality signal due to the synchronous diversity reception.

To receive such a synchronous diversity signal by the OFDM radio access, it is necessary to transmit a paging indicator having the same transmission format from each cell. Namely, it is necessary to separately define a physical channel for transmitting the same paging indicator to plural sectors as an independent physical channel different from the other physical channel required to transmit the signal unique to each sector.

Therefore, as an independent radio resource, the paging indicator channel 25 is provided to transmit the same signal from each cell to the plural sectors.

It should be noted that as another transmission method of the paging indicator, the transmission may be performed by using the L1/L2 control channel 27. In this case, no paging indicator channel 25 is defined. For synchronous diversity reception is the paging channel to which the L1/L2 control channel 27 is mapped, it should be adjusted so that the L1/L2 control channel to which the paging channel is allocated has the same transmission format temporarily.

Next, a case of uplink is described.

Figure 5:
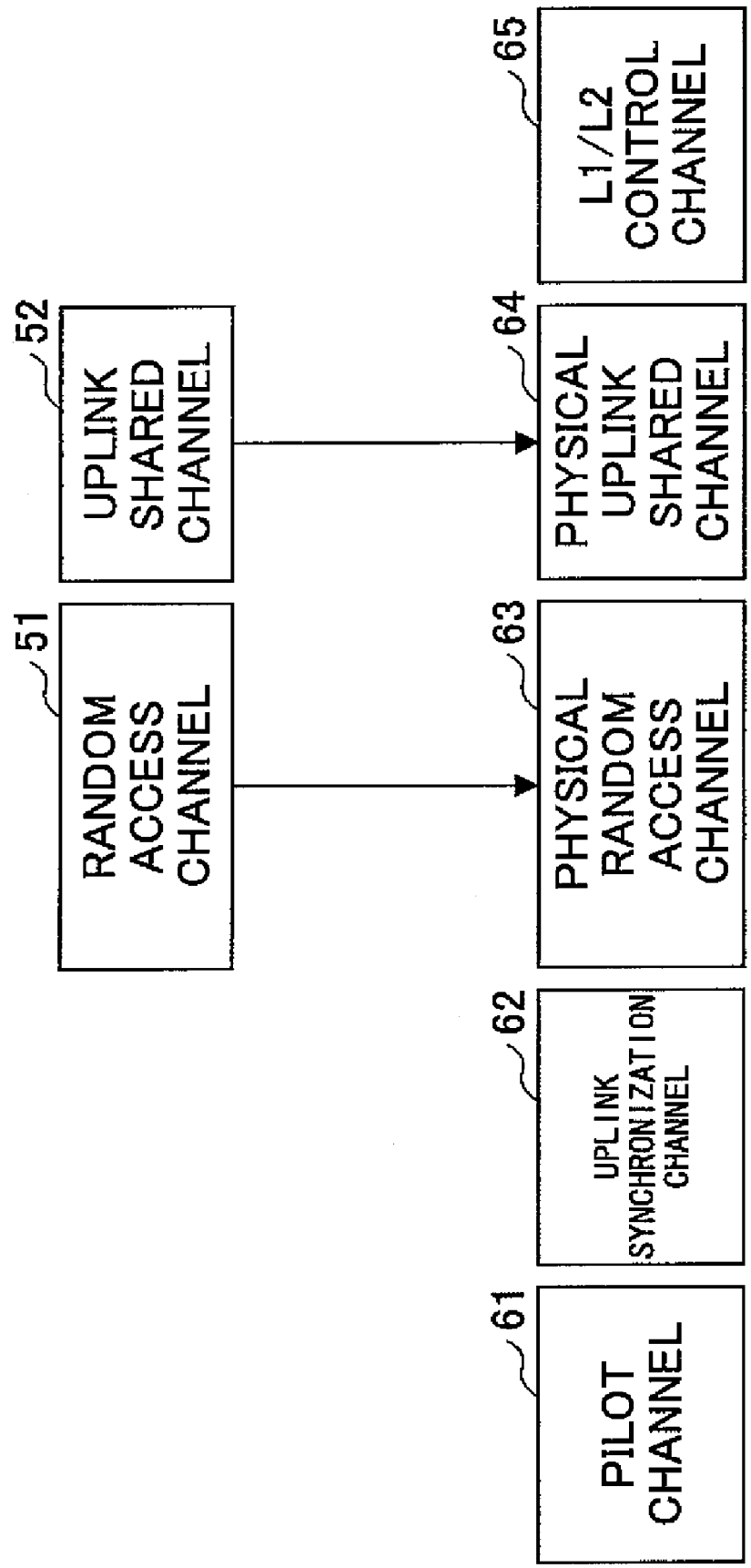
FIG. 5 is a drawing showing mapping relationships between the uplink transport channel and the uplink physical channels.

FIG. 5 is a drawing showing a configuration of uplink transport channels and the uplink physical channels, and mapping relationships between the transport channels and the physical channels according to an embodiment of the present invention.

<Uplink Channel Configuration Method>

As the first feature of the uplink channel configuration, a dedicated channel (DCH) allocated to each user is removed, and an uplink shared channel is provided. Through the uplink shared channel, effective use of the radio resources may be obtained by sharing the traffic data and the control signals of the upper layer among plural users.

More specifically, the uplink transport channels include a random access channel 51 and an uplink shared channel 52.

The random access channel 51 transmits a random access signal so that a user initially establishes an uplink.

The uplink shared link 52 transmits traffic data and control signals of the upper layer, and is shared among plural users.

On the other hand, the uplink physical channels include a pilot channel 61, an uplink synchronization channel 62, a physical random access channel 63, a physical uplink shared channel 64, and a layer1/layer2 (L1/L2) control channel 65.

The pilot channel 61 transmits reference symbols used for channel estimation.

The uplink synchronization channel 62 transmits a synchronization signal for controlling transmission timings so that uplink reception timings of plural users are within an error of the cyclic prefix.

The physical random access channel 63 transmits a signal when an uplink user performs random access.

The L1/L2 control channel 64 transmits a signal related to the layers 1 and 2.

As described above, unlike a conventional circuit-switching type radio communication system, the traffic data and the control signal of the upper layer are transmitted through the uplink shared channel 64 without using a dedicated channel for each user. Therefore, by using and sharing the common radio resources among plural users, it becomes possible to effectively use the radio resources.

<Mapping Between the Uplink Transport Channels and the Uplink Physical Channels>

Next, mapping relationships between the transport channel and the physical channel based on the above channel configuration method is described.

(Mapping of the Random Access Channel)

The random access channel is used for initially establishing a link in uplink communication, and for the following purposes:

(1) to transmit control information for establishing a link
(2) to transmit reservation information (approximate data amount, required quality, allowable delay, and the like) necessary for transmitting data through a shared data channel described below
(3) to measure reception timing for controlling uplink transmission timing Further, through this channel, each user separately starts its transmission. As a result, signals of the users may collide with each other. Therefore, this channel is important to avoid the degradation of the characteristics due to the interference of the random access channel with respect to the physical shared channel for performing scheduling so that the signals of plural users do not collide with each other.

Therefore, by providing an independent resource such as the physical random access channel, it becomes possible that the collisions may occur only in the physical random access channel of plural users. As a result, it becomes possible to avoid the degradation of the characteristics of the uplink physical shared channel due to the collisions. Namely, the base station may perform scheduling of the uplink physical shared channel for each sector without considering the influence of the random accesses, thereby maintaining the communication quality.

(Mapping of the Uplink Shared Channel)

The uplink shared channel is used for the purpose of transmitting the traffic data and the control information of the upper layer, and the uplink shared channel 52 of the transport layer is mapped to the uplink shared channel 65 in the physical layer.

The throughput in each cell or sector may be improved by performing packet scheduling for allocating radio resources to each user in consideration of the status of a propagation channel for each user so that each user can transmit the traffic data and the control information. Therefore, by providing the physical shared channel 65 so that the physical channel can be shared by plural users, the throughput of the uplink may be improved.

(Configuration Method of the Uplink Shared Channel)

The uplink shared channel is a signal for measuring a reception timing error to control the reception timings of plural users so that the reception timings of plural users are within a cyclic prefix length when the cyclic prefix is used in the uplink access. Therefore, the channel is known reference symbol for the base station and the mobile stations. Therefore, the pilot channel which is also a known reference signal may be used for measuring the reception timing error instead of defining a synchronization channel in the physical channel.

As described above, by employing a channel configuration method and mapping relationships according an embodiment of the present invention, the efficient use of the signal transmission in radio resources adapted to all packet transmission may be improved.

The present international application claims priority from Japanese Patent Application No. 2006-031745 filed on Feb. 8, 2006, the entire contents of which are hereby incorporated herein by reference.

The invention claimed is:

1. An uplink channel configuration method in a radio communication system, comprising:
   a step of providing a random access channel and an uplink shared channel as transport channels;
   a step of providing a physical random access channel as a physical channel,
      wherein the physical random access channel is an independent radio resource to which the random access channel of the transport channel is mapped; and
   a step of providing a physical uplink shared channel as a physical channel,
      wherein the physical uplink shared channel is an independent radio resource to which the uplink shared channel of the transport channel is mapped; and
   a step of sharing the uplink shared channel by a plurality of users without using a dedicated channel separately allocated to each of the plurality of users.

2. The uplink channel configuration method according to claim 1, wherein as the physical channel, there is further included a pilot channel for transmitting a reference symbol.

3. The uplink channel configuration method according to claim 1, wherein as the physical channel, there is further included a layer 1/layer 2 control channel for transmitting a signal including control information of the layers 1 and 2.

4. The uplink channel configuration method according to claim 1, wherein as the physical channel, there is further included a synchronization channel for transmitting a signal for performing transmission timing control of signals of uplink users.

5. The uplink channel configuration method according to claim 1, wherein as the physical channel, there is further included:
   a pilot channel for transmitting a reference symbol,
   wherein the pilot channel is used as a signal for performing transmission timing control of signals of uplink users.

* * * * *